US008918901B2

(12) United States Patent
Mandava et al.

(10) Patent No.: US 8,918,901 B2
(45) Date of Patent: Dec. 23, 2014

(54) SYSTEM AND METHOD FOR RESTRICTING ACCESS TO REQUESTED DATA BASED ON USER LOCATION

(75) Inventors: Srikanth Mandava, Andhra Pradesh (IN); Steven L. Greenspan, Scotch Plains, NJ (US)

(73) Assignee: CA, Inc., Islandia, NY (US)

( * ) Notice: Subject to any disclaimer, the term of this patent is extended or adjusted under 35 U.S.C. 154(b) by 632 days.

(21) Appl. No.: 12/700,303

(22) Filed: Feb. 4, 2010

(65) Prior Publication Data
US 2011/0191862 A1    Aug. 4, 2011

(51) Int. Cl.
*G06F 21/62*    (2013.01)
(52) U.S. Cl.
USPC .................................. 726/28; 726/26; 726/29
(58) Field of Classification Search
USPC ........................................................... 726/28
See application file for complete search history.

(56) References Cited

U.S. PATENT DOCUMENTS

2003/0217137 A1* 11/2003 Roese et al. .................. 709/223
2006/0069921 A1*  3/2006 Camaisa et al. .............. 713/182
2010/0077484 A1*  3/2010 Paretti et al. ................... 726/26

* cited by examiner

*Primary Examiner* — Jung Kim
*Assistant Examiner* — Tri Tran
(74) *Attorney, Agent, or Firm* — BakerBotts, LLP (57) ABSTRACT

A system and method for restricting access to requested data based on user location are disclosed. The method comprises receiving a data request and determining origin location information of the data request from a source providing information having accuracy to a predetermined standard. The method further comprises retrieving one or more policies associated with the requested data, comparing the origin location information with the policies, and dynamically adjusting access restrictions to the requested data based on the comparison.

17 Claims, 4 Drawing Sheets

SYSTEM AND METHOD FOR RESTRICTING ACCESS TO REQUESTED DATA BASED ON USER LOCATION

TECHNICAL FIELD

The present application relates generally to data transmission, and more specifically to a method and system for restricting data transmission.

BACKGROUND

Advancements in Internet technology have enabled easy data access from any location in the world. Oftentimes, however, data restriction may be necessary. For instance, in an organization, it may be important to restrict access to confidential or sensitive data only to certain employees and sometimes to employees present in secure locations. Authorized access to confidential data and protection from unauthorized access, use, and disclosure is of great importance. Data flow between systems can be unrestricted, requiring no approval, or restricted, requiring authorization or approval.

SUMMARY OF EXAMPLE EMBODIMENTS

One embodiment of the present application describes a method for restricting access to requested data based on user location. The method includes receiving a data request and determining origin location information of the data request from a source providing information having accuracy to a predetermined standard. Further, the method includes retrieving one or more policies associated with the requested data. Additionally, the method includes comparing the origin location information with the retrieved policies. Moreover, the method includes dynamically adjusting access restrictions to the requested data based on the comparison.

Another embodiment of the application describes a system for restricting access to requested data based on user location. The system includes an input module for receiving a data request, and a location identification module for determining origin location information of the data request from a source providing information having accuracy to a predetermined standard. Moreover, a fetching module retrieves one or more policies associated with the requested data. The system further includes a comparison module for comparing the origin location information with the policies, and an access module for adjusting access restrictions to the requested data based on the comparison.

In accordance with still another embodiment of the application, the system further includes an override module for overriding a data access restriction.

Certain embodiments of the disclosure may provide various technical advantages. For example, certain implementations may provide greater security than do current data access systems. As embodiments of the claimed invention dynamically restrict access based on user location, data is better protected. Further, embodiments of the claimed invention aid adherence to laws and regulations that mandate certain location based restrictions on data (for example, HIPAA).

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

Authorized access to confidential data and protection from unauthorized access, use, and disclosure is of great importance. Often, systems handling restricted data require password authorization to allow access to critical data. Password authorization, however, focuses solely on users; it does not restrict data flow to an unsecure physical location. For example, certain regulations and policies govern the flow of data outside a particular boundary. One statute, the Health Insurance Portability and Accountability Act (HIPAA), mandates that data corresponding to US citizens' heath records may only be viewable within the US.

Certain Internet web portals attempt to restrict web content access based on user location. The ABC television network website, for example, provides video streaming only to systems located within the US. If a person attempts to stream videos from any other location, access is denied. These web portals use a gateway device that determines the requesting system's location, based on its IP address. A requestor, however, can easily circumvent such systems by a number of stratagems, such as employing a proxy server within the US. Moreover, such systems merely determine whether the request originates from an approved location; they fail to accurately identify the physical user location.

These current solutions may not protect the confidentiality, integrity, and availability of information from unauthorized or insecure location and may not pay heed to the location of the request origin. Therefore, a system and method for restricting access based on user location is disclosed that may alleviate some of these problems.

The following detailed description is made with reference to the figures. Exemplary embodiments are described to illustrate the subject matter of the disclosure, not to limit its scope, which is defined by the appended claims.

Embodiments of the claimed invention dynamically restrict data access based on user location. One or more technologies or methods can be employed to determine the user's location from a source, which provides information accurate to a predetermined standard. Wherever used, the term "predetermined standard" represents a level of information relating to the user's location. The levels can range from the user's exact geographical coordinates to the user's zip code or country. Further, the predetermined standard may vary depending on the application or the requested data. Based on the predetermined standard, an appropriate source can be selected from a list including the user's IP address, telephone number, network address, GPS information, and/or other similar sources known in the art. For example, if the predetermined standard is the user's origin country, the user's IP address may be used. Alternatively, if the predetermined standard is an area within 10 feet of the user's exact location, GPS information, RFID data, or cellular network triangulation may be utilized to determine the user's location.

Further, embodiments of the claimed invention introduce a set of policies associated with the data that dictate data access. For example, the policies may include information regarding approved locations, unapproved locations, level of data restrictions, and so on. The obtained user information may be compared with the location-based information from the policies. If the user location matches approved locations, access is granted; on the other hand, if the user location matches unapproved locations, access may be restricted. In some embodiments, complete access is denied. Alternatively, partial access may be granted based on the user location and the associated policies. Moreover, the data policies may provide an override policy. Users with correct authorization may be authenticated by the system, allowing authentic users to override the access restriction.

Figure 1:
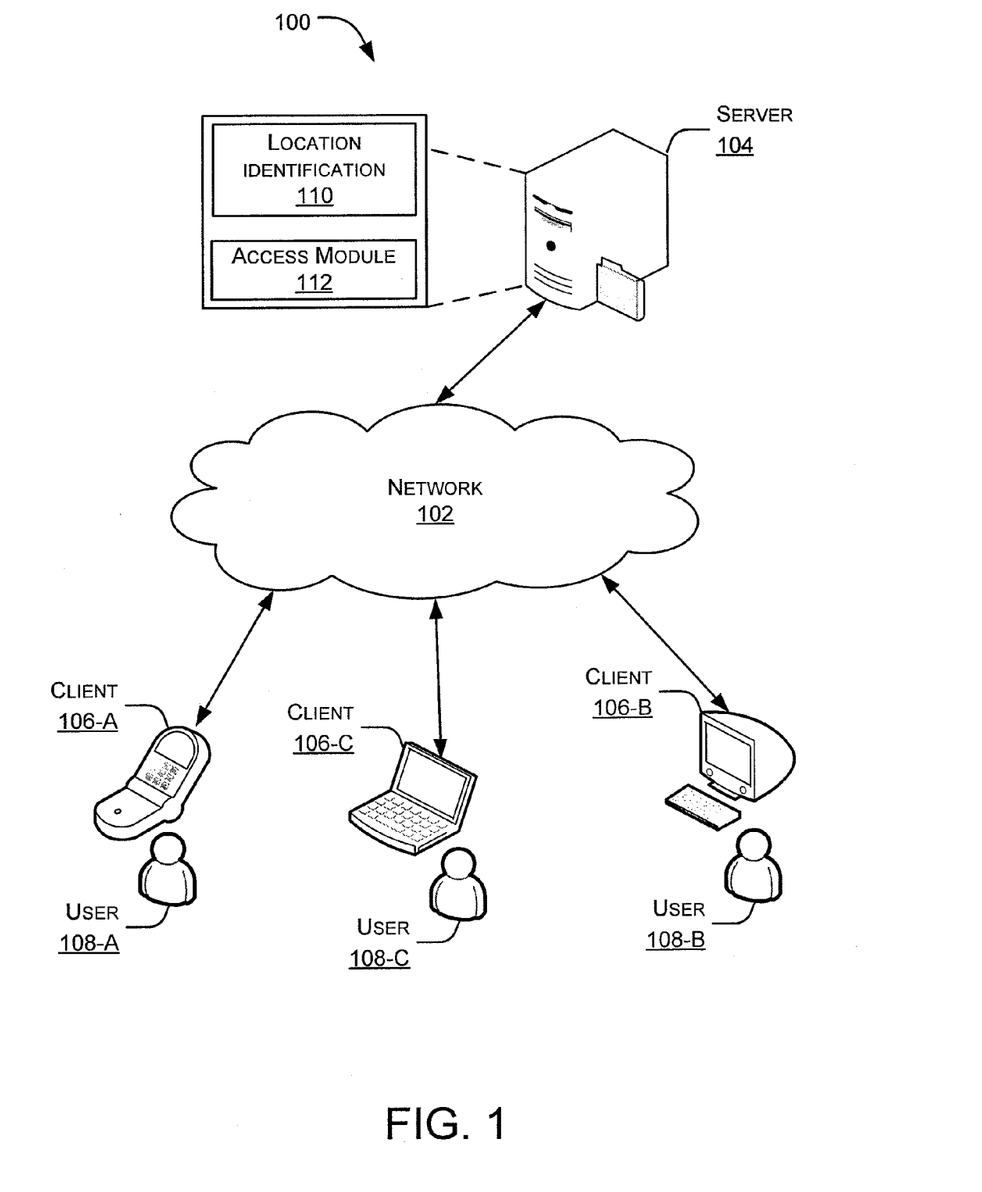
FIG. 1 is a block diagram illustrating an exemplary environment in which the subject matter of the disclosure can function.

FIG. 1 illustrates an exemplary environment 100 in which the subject matter of the disclosure can function. The environment 100 generally includes a network 102 communicatively coupling a server 104 to one or more clients 106. Users 108 may be present on clients 106 to generate data requests, provide authorization and authentication information, and receive the requested data.

The network 102 generally refers to any interconnecting system capable of transmitting audio, video, signals, data, messages, or any combination of the preceding. Further, the network 102 may include all, or a portion of a public switched telephone network (PSTN), a public or private network, a local area network (LAN), a metropolitan area network (MAN), a wide area network (WAN), a local, regional, or global communication or computer network such as the Internet, a wired or wireless network, an enterprise intranet, other suitable communication link, or any combination of similar systems.

The server 104 may include, for example, a file server, a domain name server, a proxy server, a web server, a computer workstation, or any other device operable to dynamically adjust the access restrictions imposed on the requested data by the environment 100. Further, the server 104 may use any appropriate operating system, such as MS-DOS®, MAC-OS®, WINDOWS®, UNIX®, or any other operating system currently in existence or developed in the future.

As used here, the term "client", as with clients 106, generally refers to any suitable device operable to communicate with the server 104 through the network 102. Further, the clients 106 may employ any known operating systems such as MS-DOS®, PC-DOS®, OS-2®, MAC-OS®, or any other appropriate operating systems. The clients 106 may include, for example, a personal digital assistant, a computer (e.g., a laptop, a desktop workstation, a server, etc.), a cellular phone, a mobile interne device (MID), an ultra-mobile PC (UMPC), or any other device operable to communicate with the server 104 through the network 102.

Security measures for restricting data access may be performed in the environment 100. For example, users 108 may request data from the server 104. In one implementation, user 108-A may request access to a web portal from the server 104. The user 108-A resides in Korea, and certain limitations or license agreements may bar access to the web portal from Korea. The server 104 includes a location identification module 110, which determines the user's 108-A location. For example, the user 108-A operates a PDA and the server 104 obtains the IP address of the PDA. Based on the IP address, the server 104 may determine the approximate location of the user 108. Alternatively, to obtain more accurate location information, the server may use GPS information from the PDA handset's mobile network to determine the user's location. Upon determination that the user 108-A resides in Korea, an access module 112, present on the server 104, may deny access to the user 108-A, or provide limited access to the user 108, based on certain policies or agreements. In some embodiments, the user 108-A may attempt to override the access restriction by providing an authorization code, or a password, to obtain the data.

It will be understood that the accuracy of the user's location determined by the server 104 may vary depending on the application of the present invention. In the example described above, merely determining that the user is located in Korea was sufficient. There will be other applications, however, where more accurate user location may be required. For example, in some applications, an accurate location of within a few feet from the user may be required, or the server 104 may have to determine the user's street address. In these applications, the server 104 will have to rely on sources of location information that provide more accurate results than the IP address of the incoming request. These and other embodiments of the claimed invention will be described in detail with reference to FIGS. 2-4.

Figure 2:
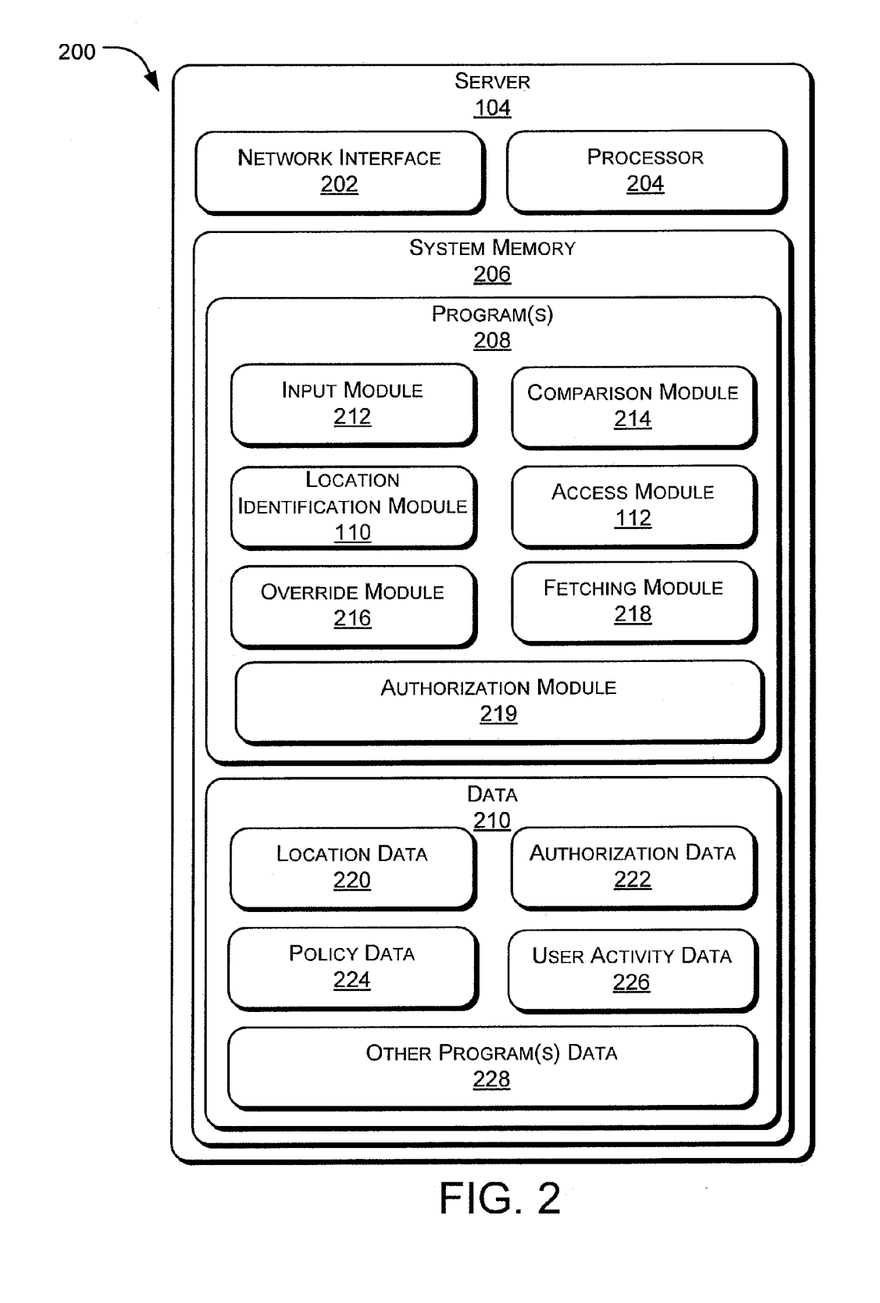
FIG. 2 is a block diagram illustrating an exemplary computing device for restricting data flow based on user location.

FIG. 2 illustrates an exemplary computing device 200 for restricting data flow based on user location. In one embodiment of the present disclosure, the computing device 200 can be the server 104, which can include a network interface 202, processor 204, and a system memory 206. The network interface 202 connects the server 104 to the network 102 for servicing data requests made by client 106. The processor 204 may be utilized for processing requirements of the server 104. The system memory 206 is further divided into one or more program(s) 208 and data 210. The data 210 includes various data banks for storing different data. The programs 208 store various program modules designed to dynamically restrict data access based on user location. The network interface 202 may refer to any suitable device capable of receiving an input, sending an output from the server 104, performing suitable processing of the input or output or both, communicating with other devices, and so on. For example, the network interface 202 may include appropriate modem hardware, network interface card, and similar devices. Further, the software capabilities of the network interface 202 may include protocol conversion and data processing capabilities, to communicate through a LAN, WAN, or other communication system, allowing the server 104 to communicate to other devices. Moreover, the network interface 202 may include one or more ports, conversion software, or both.

The processor 204 can be any suitable device capable of executing instructions and manipulating data to perform operations for the server 104. Processor 204 may include microprocessors, microcomputers, microcontrollers, digital signal processors, central processing units, state machines, logic circuitries, and/or any devices that manipulate signals based on operational instructions. For example, processor 204 may be any central processing unit (CPU), such as the Pentium processor, the Intel Centrino processor, and so on.

Further, the system memory 206 may be any suitable device capable of storing computer-readable data and instructions. For example, the system memory 206 may include logic in the form of software applications, random access memory (RAM) or read only memory (ROM). Further examples may include mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination of any of the preceding.

The programs 208 include various modules for restricting data flow based on user location, such as an input module 212, a location identification module 110, a fetching module 218, a comparison module 214, an access module 112, an override module 216, and an authorization module 219.

The data 210 may include data that is stored and used by one or more of the program 208 or data that is generated on execution of any one program 208. For example, the data 210 may have location data 220, authorization data 222, policy data 224, user activity data 226, and other program data 228.

The input module 212 receives and processes all incoming data requests. For example, if the server 104 is a web server, the input module 212 may receive web content requests, streaming requests, download requests, or upload requests. Alternatively, if the server 104 is an organizational server, the incoming data requests may be file requests, download requests, requests to modify data, application requests, server update requests, virus updates, and so on. Those in the art will appreciate that the incoming data requests may further include requests for accessing emails, websites, the Internet, intranet, virtual private networks (VPN), online webmails, gaming console applications, remote electronic circuit testers such as Advantest T5581, or any other similar applications. The input module 212 processes the web requests and forwards them to the location identification module 110. Also, it should be noted that the illustrated device 200 includes only a single network interface 202, processors 204, and program 208; in other embodiments, these items may be present in multiple items, or combined items, as known in the art.

The location identification module 110 determines the originating location of the data request forwarded by the input module 212. For example, if the data request is generated from a computing device using the TCP/IP protocol, the location identification module 110 may retrieve the request's IP address from the data packets received. In certain situations, an IP address may not sufficiently disclose the user's location, and in such situations, the location identification module 110 may attempt to obtain secondary information from the user 108 or the client 106. Other sources of location information may include geographical positioning system (GPS) information, cell phone device information, device network information, cell phone platform information, or information obtained from RFID devices. If the data request originates from a cell phone, the system can take advantage of the fact that most cell phones include GPS information, and allow the location identification module 110 to ascertain the user location from that source. Alternatively, if the user 108 employs a PC or laptop, the location identification module 110 may request the user 108 to dial-in using a cell phone, and based on the user's cell phone number or GPS information from the cell phone, the user's location may be ascertained.

Further, Radio Frequency Information Devices (RFIDs) can be used to determine the data request location, by either requiring a person to carry the RFID device that includes a location-bound reader, or requiring the person to carry a location-bound RFID device that can transmit the user's location to the client 106. It will be understood by a person skilled in the art that any combination of the sources mentioned here may be utilized to obtain the user's location information. Further, it will be understood that any similar sources, not mentioned here, may also be contemplated to obtain user location information.

The fetching module 218 retrieves one or more policies associated with the requested data from the policy data 224. The policies determine the type of data restrictions or the extent of data restrictions imposed on the data. In one embodiment, the policies may include one or more approved or unapproved locations, to which data transfer may be allowed or denied. For example, the policies may include a database of approved locations, from where data access may be allowed, such as any place in the US for a HIPAA regulated portal, or an employee's workplace or home address for an organizational server. Alternatively, the policies may include a database of unapproved locations, such as Afghanistan, Pakistan, or North Korea for government sensitive information, or New York's Grand Central Station for organization sensitive data.

In other embodiments, the policies may include metadata policies, override data policies, data access policies, and similar data. The metadata policies may add a level of access rights and security options to the requested data or applications. For example, a document file may only be readable rather than possessing write or modify rights. A PDF application may include printing, copying, or saving restrictions. The override data policy provides information regarding an override feature. The requested data may either support this facility or not. Data access policies may include information regarding the type of data restriction permissible for the requested data. For example, a data access policy may allow partial or complete data restriction, apply variable data access rights, or enforce variable functionality access.

The comparison module 214 compares the origin location information with the policies retrieved by the fetching module 218. In one embodiment, the fetching module 218 may retrieve a list of approved locations; alternatively, the fetching module 218 may fetch a list of unapproved locations. According to alternative embodiments, the fetching module 218 may retrieve lists of both approved locations and unapproved locations. The comparison module 214 is provided with both the data request location and the approved and/or unapproved location list retrieved by the fetching module 218. If the data request location is present in the list of approved locations, the access module 112 grants access to the data. On the other hand, if the data request location is not present in the approved list, or is present in the list of unapproved locations, the access module 112 can deny access to the data.

Further, the access module 112 can dynamically determine whether to provide access, deny access, or provide partial access. Along with the list of approved and unapproved locations, the policies may include information regarding the extent of permissible data access based on the user location. For example, locations can be graded according to very safe, safe, partially safe, or unsafe. If, based on the comparison, the server 104 determines that the user location is partially safe, the server 104 may provide only partial access to the user 108. Alternatively, if the server 104 determines that the location is safe, the server 104 may provide more access rights than if the user 108 was located in a partially safe or unsafe location.

Metadata associated with the data may include the information required by the server 104 to make this decision. It will be understood, however, that the policies may include any other data, or any other criteria to restrict data access. In one embodiment, partial data rights may be granted to the user 108 based on the user's location. For example, the user 108 may be provided only read rights if the user 108 is not located in an approved or safe location. Further, information about data access may be logged by the access module 112 and stored in the system memory as user activity data 226. This data may be utilized later for auditing or security purposes. The information logged by the access module 112 may include user details, user's location, policy data, files accessed or downloaded by the user, time of data access, duration of data access, extent of access granted, and other similar access related information. The stored user activity data 226 may be used to modify the policies for future data access. For example, user activity data 226 may have a log for data access by a user from a US location for a one-hour period and from another location in India after that first hour. This logged activity may raise security concerns and may be used to modify policies for data access for that user.

Further, the override module 216 may allow users 108 to override the data access restrictions set on the requested data. In one embodiment, the data includes an override feature. In these situations, based on the user location, if the access module 112 restricts data access, the user 108 may be allowed to override the access restriction. For example, the server 104 may display an override option, and if the user 108 has correct authentication information, the user 108 may be allowed to override the restriction. In one embodiment, the override module 216 may request the user 108 to enter a password, call in to a remote server, request a call-out from a remote server to the user's cell phone, provide personal details, and so on. In an alternative embodiment, if the requested data has high security levels, the override module may deny access to the requested data, and instead provide access to related information with lower security levels, based on a user's request. Further the user 108 may send a request to an administrator or data content owner for real-time authorization to access data.

The override module 216 may invoke the authorization module 219 to authenticate the user 108. The authorization module 219 may extract authorization data 222 corresponding to the user 108, and validate the information entered by the user 108. If the override module 216 validates the information, the user 108 may be allowed complete or partial access to the data based on the policies associated with the data. In one embodiment, the override module 216 may also request authentication of the user's need for the data. This may be the case for special business requirements or in cases when secondary authorization is required. For example, if a user 108 wants to access a company's confidential file, accessible only from secure locations such as the company's corporate center or an employee's house and the like, the user 108 can make a phone call to override the data restrictions. Based on the phone call, in conjunction with the authentication information provided by the user 108, the server 104 may allow access to the requested data.

It will be understood that the override module 216 may utilize different methods for overriding the access restrictions, including sending a password, communicating either through on-screen instructions, through a voice service to a third party, or by sending an authorization code to the server 104 or a third party authorization system. Other methods of overriding the environment 100 may include using information from both the IP address of the client 106, and the call-in cell phone number of the user 108.

In another embodiment, the server 104 may grant access to users based on their roles in an organization, or based on some other criteria. For example, the authorization data 222 may include a role-based database, a user identity-based database, or some combination thereof. The role-based database may include levels or types of access permitted for the users based on their roles in the organization. For example, on determination that the user is a vice-president, the server 104 may grant complete access to the user, while if it is determined that the user is an associate, the server 104 may only grant partial access, such as read-only rights. On the other hand, the identity-based database may include user names, biometric identity, visual appearance, face recognition data, or the like, with associated access rights. The server 104 may provide access to the data based on the access rights of the user. Here, a user with a particular name "Mr. John Smith" may be allowed data access if the identity-based database has an entry for that user. Further, the user may be asked for secondary identification information to authenticate his identity. The secondary information can include digital signatures, fingerprints, voice recognition, still images, video images, or any other human identification information.

The location data 220 stores data corresponding to the origin location of the data request made by the user 108. The policy data 224 stores one or more policies associated with the requested data. The policies may include data corresponding to approved and/or unapproved locations. For example, policy data 224 may include a compilation of all locations from which a data request may be provided access, and a list of all locations from which a data request should be denied. The policy data 224 may be set by the server 104. The policies may also set the restriction level on the data requested. The policies may allow complete access or no access to the data requested. They may allow partial access to the data, such as read or write access and no modify access. Alternatively, the policies may allow partial data view, for example, if a user 108 requests a complete web page, only portions of the web page, such as contacts, or help data may be provided and access to the rest may be denied. The data 210 may further include authorization data 222 that stores data required for authorizing users 108 in some embodiments. The authorization data 222 may require a password or a call initiated to another person or system that has the right to authorize the request.

The data 210 may further include other program data 228 that may be needed by the programs for processing. Such data could include information about data access frequency within a specific timeframe from specific locations, or the security and access policies associated with requested data. Other forms of program data 228 may include information about the machine addresses of clients such as MAC (Media Access Control) address to control data access so that only clients with registered MAC addresses are allowed to access restricted data.

Figure 3:
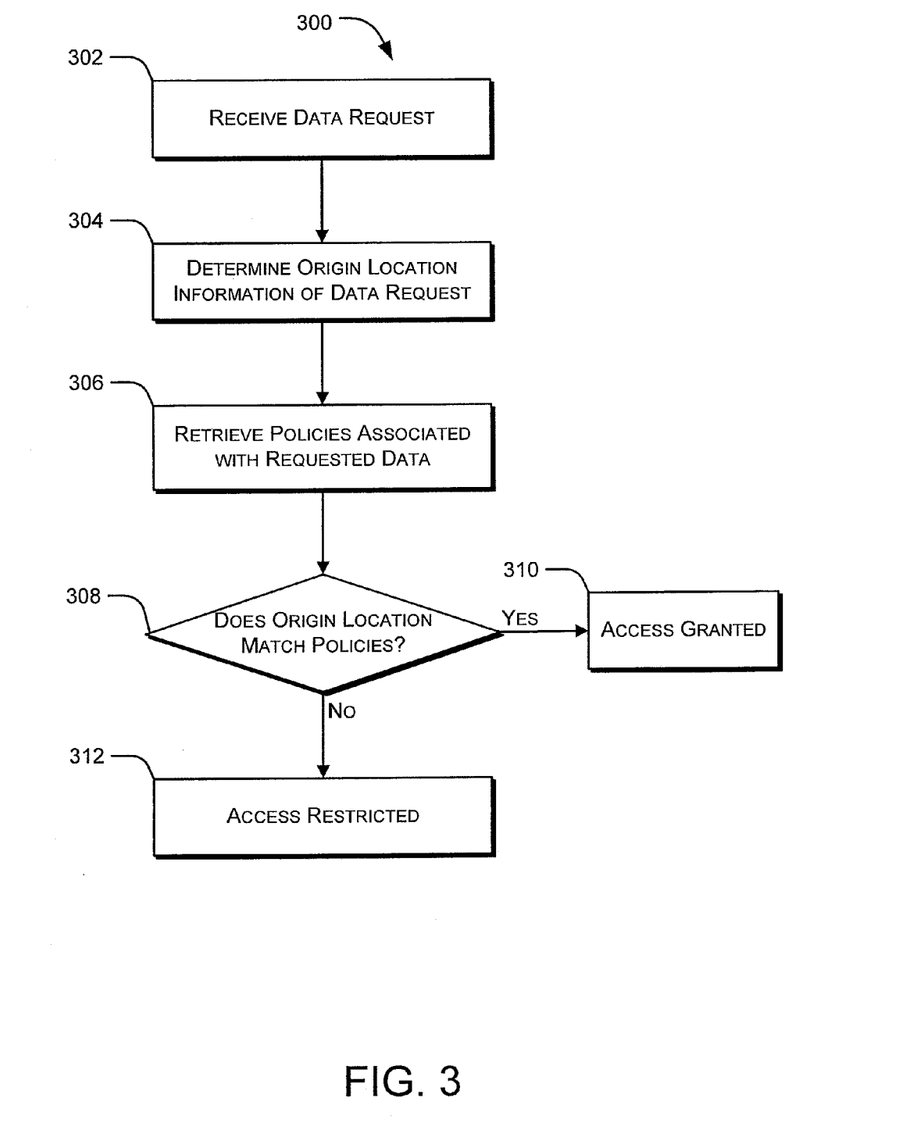
FIG. 3 is a flow chart illustrating an exemplary method for restricting data flow based on user location.
Figure 4:
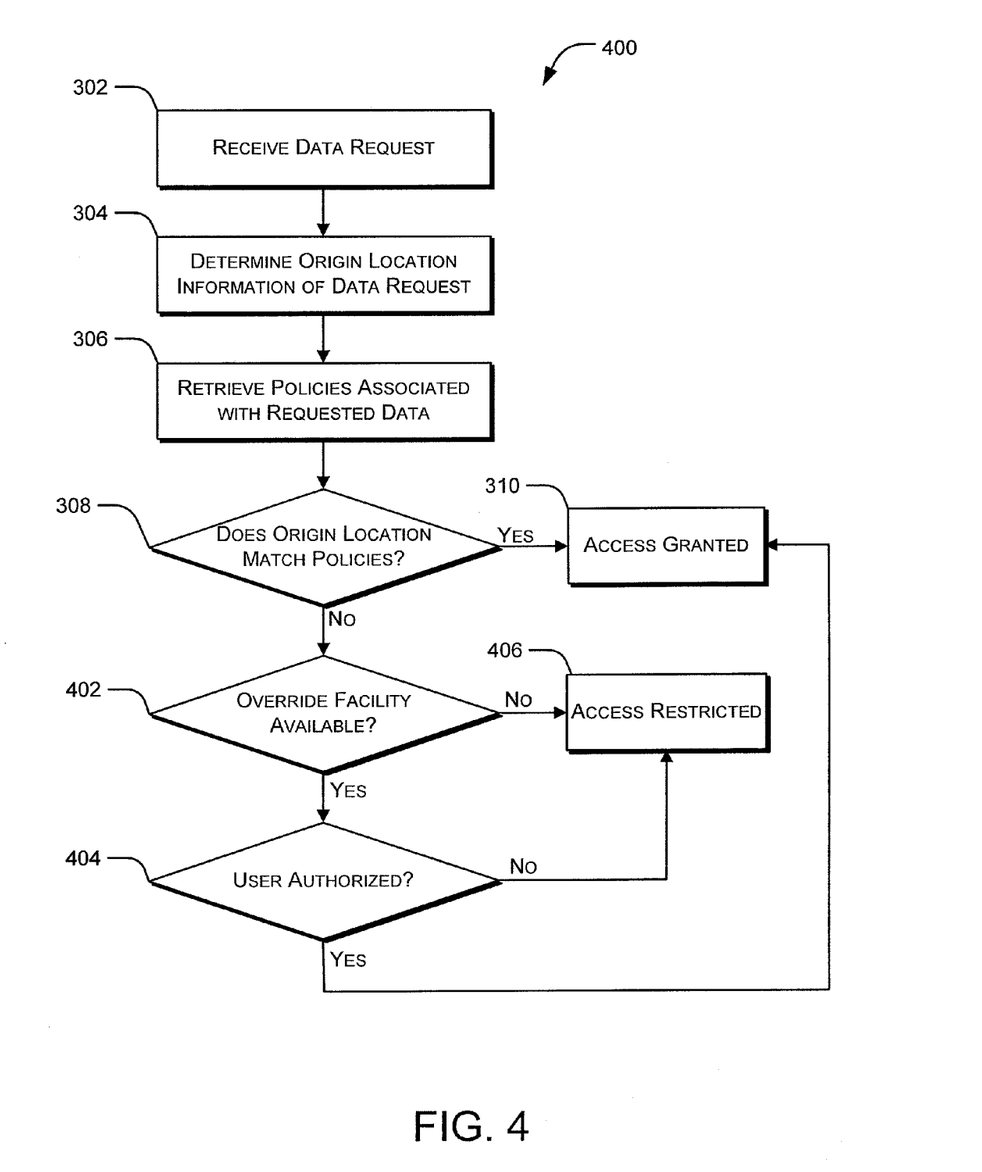
FIG. 4 is a flow chart illustrating an alternative embodiment for restricting data flow based on user location.

FIGS. 3 and 4 illustrate exemplary methods 300 and 400 for restricting data flow based on user location. The exemplary methods are described with reference to the environment 100 and the computing device 200 introduced in FIGS. 1 and 2. These exemplary methods may be described in the general context of computer executable instructions. Generally, computer executable instructions can include routines, programs, objects, and the like that perform particular functions. The methods may also be practiced in a distributed computing environment where functions are performed by remote processing devices that are linked through a communications network. In a distributed computing environment, computer executable instructions may be located in both local and remote computer storage media, including memory storage devices.

In FIG. 3, the process begins at step 302, where the input module 212 receives a data request. Here, the user 108 may require access to data stored on the server 104. To this end, the user 108 may use the client 106 to send a data request to the server 104. The input module 212 receives this data request.

Moving to step 304, the input module 212 provides the data request information to the location identification module 110. At this step, the location identification module 110 determines the user 108 location, or the origin location of the data request from a source providing information having accuracy to a predetermined standard. The user 108 may use a proxy server to hide the origin location of the data request, or the physical location of the user 108. In order to circumvent such an attempt, the location identification module 110 may use one or more sources to determine the user's actual location. In one embodiment, the location identification module 110 retrieves the IP address of the user's computing device, such as client 106-A, either from the received data packets or by pinging the client 106-A. If this information is not sufficient to determine the user's location, or if the predetermined standard requires a more accurate representation of the user's location, the location identification module 110 may utilize alternate methods for location identification. These may include geographical positioning system (GPS) information, cell phone device information, or similar methods, such as those discussed above. It will be understood that a combination of the sources may be utilized to determine the origin location.

At step 306, the fetching module 218 retrieves one or more policies from policy data 224. The policies may include a list of approved or unapproved locations either allowed or denied access to the requested data. The policies may also set the restriction level on the data requested. The policies may allow complete access or no access to the data requested. They may further allow partial access or partial access rights to the user 108 providing access to parts of a document or limited functionality of an application. For example, the policies may be set such that a user 108 located in an unapproved location may access only certain tabs of the HIPAA database or the complete HIPAA database. In one embodiment, the policies may include one or more lists of locations ordered according to level of location safety.

It will be understood that the order of steps 304 and 306 may be reversed without departing from the scope of the present disclosure. Further, these steps may be performed simultaneously. Once the data request is received, the location identification module 110 may obtain location information and the fetching module 218 may retrieve policies concurrently.

The method 300 continues to step 308 where the comparison module 214 compares the identified user location with the retrieved policies. In one embodiment, the comparison module 214 compares the user location with a list of approved locations. Alternatively, the module may compare the user location with a list of unapproved locations, or the comparison module 214 may compare the user location with one or more lists of locations ordered according to level of location safety. Based on the comparison, the comparison module 214 either provides a positive result indicating the user 108 is located in an approved location, a negative result indicating the user 108 is located in an unapproved location, or a ranked result indicating the level of safety of the user's locations. The comparison module's result is provided to the access module 112.

At step 310, the access module 112 dynamically restricts access to the requested data based on the comparison. The access module 112 can provide complete access, restrict complete access, or restrict partial access to the data. If the comparison result is positive, the access module 112 grants complete access to the requested data and the data is forwarded to the client 106. If the comparison result is negative, the access module 112 may restrict access completely or partially, based on the policies associated with the data. If the comparison result is a ranked result based on the level of safety of the user's location, the access module 112, again, may restrict data access either partially or completely, based on the policies associated with the data and the user's location.

For example, if the comparison result indicated that the user 108 is present in a partially safe location, the access module 112 may provide partial access, if the data policies allow partial data access. In some embodiments, the data policies may include only complete access or restriction, and in such cases, even if the user 108 is present in a partially safe location, the server 104 may restrict complete access. Further, if the user 108 is located in a partially safe location, the server 104 may request additional information from the user 108 before deciding the type of access restrictions to impose on the requested data. For example, the access module 112 may request the user 108 to specify the reason for requesting data access, or the type of data access required.

FIG. 4 illustrates an alternative embodiment for restricting data flow based on user location with an additional feature for overriding the data restrictions applied by the access module 112. The method 400 is similar to method 300 up to step 310. At step 402, the method 400 determines whether the requested data includes an override facility. In one embodiment, the policies associated with the data include override information. If the override facility is not available ('no' branch from step 402), the data restrictions applied in step 310 remain at step 406. If the override facility is available ('yes' branch from step 402), however, the override module 216 may allow the user 108 to override the data restrictions applied to the data by the access module 112 at step 404.

Here, the override module 216, along with an authorization module 219, determines whether the user 108 has authorization to access the data, in spite of the data restrictions applied. In one embodiment, the user 108 provided an access code, a password, personal details, or the like to the authorization module 219. Alternatively, the authorization module 219 may request the user 108 to call a third party service connected to the authorization module 219 to verify the user's credentials. In another embodiment, the authorization module 219 may also authenticate the user's data requirement. The user's need may be authenticated in situations where the user 108 may be known but the user's special business need may need to be recorded.

In other embodiments, the authorization module 219 may request the user 108 to authenticate her role in the organization using the authorization data 222. For example, the override module 216, using the role based database, may allow data access to an executive vice president (VP) of a group irrespective of the user location but it may require a manager to access only to from a secure location.

If the user 108 is not authorized to access the data, or if the user 108 cannot provide the correct authentication information ('no' path from step 404), the access restrictions applied by the access module 112 hold. If, on the other hand, the user 108 is authenticated ('yes' path from step 404), the access module 112, at step 408, may change the access restrictions, by providing either partial or full data access based on the user requirement, and authentication information. For example, the vice president (VP) of a group, may be provided full access even if the VP is in a location deemed unsafe by the server 104, if the VP can provide authentication information or the special business need for the data from the current location. Alternatively, an associate in the same group may be provided restricted access from an unsafe location, even if the associate is able to provide authentication information and specify a business need. It will be understood that the examples stated here merely aid in understanding different embodiments of the disclosure and not to limit the scope of the claimed invention.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the claimed invention.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor such as processor 204. Method steps according to the claimed invention can be performed by a programmable processor such as processor 204 executing a program of instructions to perform functions of the claimed invention by operating based on input data, and by generating output data.

Although the present invention has been described in detail, it should be understood that various changes, substitutions, and alterations can be made without departing from the spirit and scope of the invention as defined by the appended claims.

What is claimed is:

1. A method comprising:
   receiving a data request that originated at a first device from a user;
   obtaining first location information for the user, the first location information having a first level of accuracy for determining a location of the user;
   retrieving one or more policies associated with the requested data;
   comparing the first location information with the one or more policies;
   determining that the first level of accuracy is less than a level of accuracy required to determine whether access restrictions apply to the requested data, based on the comparison;
   obtaining second location information from the user, the second location information having a second level of accuracy that is greater than or equal to the level of accuracy required to determine whether access restrictions apply to the requested data; and
   determining whether access restrictions apply to the requested data based at least in part on the second location information,
   wherein obtaining second location information comprises:
   requesting the user to transmit the second location information from a second device, and
   receiving the second location information from the second device.

2. The method of claim 1, further comprising:
   determining that access restrictions apply to the requested data; and
   in response to determining that access restrictions apply to the requested data, requesting secondary authentication of the user; and
   overriding the access restrictions if the secondary authentication is successful,
   wherein the secondary authentication comprises retrieving authorization information from the user.

3. The method of claim 2, wherein:
   retrieving authorization information comprises requesting user to dial-in with a phone, and
   the authorization information comprises the phone number of the phone.

4. The method of claim 1, wherein the access restrictions comprise partial restrictions on the requested data, or complete restrictions on the requested data.

5. The method of claim 1, wherein:
   the first location information comprises an internet protocol (IP) address;
   obtaining first location information comprises at least one of:
   obtaining the IP address from a received data packet, and pinging the first device for the IP address; and
   the second location information comprises at least one of geographical positioning system (GPS) information, cell phone device information, device network information, cell phone platform information, database information, user profile information, network access type, wireless access point information, or physical access control information.

6. The method of claim 1, wherein the data further includes executable code.

7. The method of claim 1, wherein retrieving one or more policies comprises retrieving at least one of approved locations, unapproved locations, locations ranked based on safety of location, override information, and data access information.

8. The method of claim 1, wherein the level of accuracy required to determine whether access restrictions apply to the requested data ranges from exact geographical coordinates of the user to the data request's origin country.

9. A system comprising:
   a processor-controlled server, the server comprising:
   a memory;
   an input module being operable to receive a data request originating at a first device from a user;
   a location identification module being operable to obtain first location information for the user, the first location information having a first level of accuracy for determining a location of the user;
   a fetching module being operable to retrieve one or more policies associated with the requested data;
   a comparison module being operable to compare the location information with the one or more policies to determine whether the first level of accuracy is less than a level of accuracy required to determine whether access restrictions apply to the requested data; and
   an access module being operable to determine whether access restrictions apply to the requested data based on the location of the user,
   wherein the location identification module is further operable to obtain second location information if the first level of accuracy is less than the level of accuracy that is required to determine whether access restrictions apply to the requested data, the second location information having a second level of accuracy that is greater than or equal to the level of accuracy required to determine whether access restrictions apply to the requested data, and
   wherein the location identification module is further operable to obtain second location information by:
   requesting the user to transmit the second location information from a second device, and
   receiving the second location information from the second device.

10. The system of claim 9, wherein:
    the access module comprises a secondary authentication module to authenticate the user;
    the secondary authentication module is operable to request secondary authentication information from the user if it is determined that access restrictions apply to the requested data based on the location of the user; and
    the access module is further operable to override the access restrictions if the secondary authentication is successful.

11. The system of claim 9, wherein:
    the first location information comprises an internet protocol (IP) address;

the location identification module is operable to obtain first location information by at least one of:
obtaining the IP address from a received data packet, and pinging the first device for the IP address; and
the second location information comprises at least one of geographical positioning system (GPS) information, cell phone information, device network information, or cell phone platform information, database information, user profile information, network access type, wireless access point information, or physical access control information.

12. The system of claim 9, wherein the fetching module is operable to retrieve at least one of approved locations, unapproved locations, locations ranked based on safety of location, override information, or data access information.

13. The system of claim 9, wherein the level of accuracy required to determine whether access restrictions apply to the requested data ranges from exact geographical coordinates of the user to the data request's origin country.

14. The system of claim 10, wherein:
the secondary authentication module is operable to request secondary authentication information by requesting the user to dial-in with a phone, and
the authorization information comprises the phone number of the phone.

15. Logic encoded in a non-transitory computer readable media, the logic operable when executed by a computer processor to:
receive a data request that originated at a first device from a user;
obtain first location information for the user, the first location information having a first level of accuracy for determining a location of the user;
retrieve approved location information associated with the requested data;
compare the first location information with the approved location information to determine whether the first level of accuracy is less than a level of accuracy required to determine whether access restrictions apply to the requested data; and
obtain second location information if the first level of accuracy is less accurate than the level of accuracy required to determine whether access restrictions apply to the requested data, the second location information having a second level of accuracy that is greater than or equal to the level of accuracy required to determine whether access restrictions apply to the requested data; and
determine whether access restrictions apply to the requested data based at least in part on the second location information,
wherein the logic is operable to obtain second location information by:
requesting the user to transmit the second location information from a second device, and
receiving the second location information from the second device.

16. The logic of claim 15, further operable when executed by a computer to:
request the user to dial-in with a phone to provide authorization information if it is determined that access restrictions apply to the requested data; and
override the access restrictions if authorization is successful,
wherein the authorization information comprises the phone number of the phone.

17. The logic of claim 15, wherein:
the first location information comprises an internet protocol (IP) address;
the logic is operable to obtain first location information by at least one of:
obtaining the IP address from a received data packet, and
pinging the first device for the IP address; and
the second location information comprises at least one of geographical positioning system (GPS) information, cell phone information, device network information, cell phone platform information, database information, user profile information, network access type, wireless access point information, or physical access control information.

* * * * *